3,390,956
OXIDATION OF MERCUROUS TO MERCURIC SALTS
Brian Crosbie Fielding, Northwich, and George Wallace Hooper, Norton-on-Tees, England, assignors to Imperial Chemical Industries Limited, London, England, a corporation of Great Britain
No Drawing. Filed June 14, 1965, Ser. No. 463,905
Claims priority, application Great Britain, July 6, 1964, 27,762/64
9 Claims. (Cl. 23—85)

ABSTRACT OF THE DISCLOSURE

There is provided a process for oxidising mercurous salts to the corresponding mercuric salts in an acidic aqueous medium by means of oxygen in the presence of a metal catalyst chosen from Group VIII of the Periodic Table and from gold. The chosen metal is neither soluble in nor attacked by the acidic aqueous medium, characterised in that the oxidation reaction is carried out under superatmospheric pressure wherein the oxygen partial pressure is from 10 to 150 atmospheres and the reaction temperature is from 60° C. to 150° C.

---

This invention relates to a process for oxidising mercurous salts to the corresponding mercuric salts; it also relates to a process for oxidising olefines by means of mercuric salts.

In United States application S.N. 348,880 we have described a process for oxidising a mercurous salt to the corresponding mercuric salt by means of gaseous oxygen at atmospheric pressure in an acidic aqueous medium in the presence of a metal catalyst that is not soluble in nor attacked by the medium. The catalyst was chosen from metals of Group VIII of the Periodic Table and silver and gold and of these palladium, platinum and silver were particularly useful.

We also described in the same application a process for oxidising olefines containing at least three carbon atoms to give unsaturated aldehydes and ketones comprising two concurrent reactions, one of which was the oxidation of olefine by mercuric salt with consequential reduction of the latter to mercurous salt, and the other was the concurrent re-oxidation of the mercurous salt to mercuric salt by means of oxygen and metal catalyst as hereinbefore described.

With reference to the oxidation of the mercurous salt we stated that in dilute solutions, that is to say up to a concentration of about 1% by weight it is possible to convert about 90% of the mercurous salt into the corresponding mercuric salt, but that in more concentrated solutions the proportion oxidised is less, for example about 50% for concentrations of about 10%. Further work has shown that above concentrations of about 10% of mercurous salt the proportion oxidisable to mercuric salt becomes markedly less than 50%, and can fall as low as 25%.

We have now found that if the oxidation reaction of mercurous salt to mercuric salt is carried out under an oxygen pressure greater than atmospheric surprisingly high conversions of the order of 60-100% can readily be achieved, not only in dilute solutions but also in more concentrated solutions up to about 30% by weight of mercurous salt.

Thus according to our invention a process for oxidising mercurous salts to the corresponding mercuric salts in an acidic aqueous medium by means of oxygen in the presence of a metal catalyst chosen from Group VIII of the Periodic Table and from gold, the chosen metal not being soluble in nor attacked by the acidic aqueous medium, is characterised in that the oxidation reaction is carried out under superatmospheric pressure as hereinafter defined.

The process of the invention may be combined with the process for oxidising olefines containing at least three carbon atoms by means of mercuric salts in acidic aqueous media to give unsaturated aldehydes and ketones, in such a way that the two reactions run consecutively.

Superatmospheric pressure is defined as an oxygen partial pressure of from 10 to about 150 atmospheres preferably from 40 to 60 atmospheres. A marked increase in the percentage conversion of mercurous salt to mercuric salt begins to be noticed at oxygen pressures as low as 10 atmospheres.

With regard to the temperature of the oxidation reaction of mercurous salt to mercuric salt it was found that at atmospheric pressure the range 60° C. to 90° C. was the most convenient. When the reaction is carried out under superatmospheric pressure higher temperatures are possible, for example up to about 150° C., but a preferred range is 90° C. to 110° C. The reaction can also be carried out at the lower temperatures if particular conditions make the higher temperature ranges undesirable.

Of the metal catalysts hereinbefore defined palladium and platinum are particularly useful. Silver cannot be employed since under superatmospheric pressures it dissolves in acidic aqueous media of the type commonly used in the process. The metal is preferably in a finely divided form and supported on an inert material for example silica or alumina. From 1% to 5% by weight of metal on the support is suitable.

The acids of the acidic aqueous medium are preferably those corresponding to the mercurous salts; among them are sulphuric, perchloric, nitric, acetic and trifluoroacetic acids, and various sulphonic acids for example benzenesulphonic acid, p-toluenesulphonic acid. Of these perchloric and trifluoroacetic acids are particularly suitable. A convenient concentration for the acid in the reaction system is from 0.50 to 2.0 normal though higher concentrations may be used if necessary.

Example 1 illustrates the preparation of a palladium catalyst supported on silica, and containing 5% by weight of palladium. Example 2 illustrates for purposes of comparison an oxidation of mercurous perchlorate at atmospheric pressure and Examples 3 and 4 illustrate the process of the invention carried out under a pressure of 50 atmospheres.

Example 1

Silica gel was washed six times with concentrated hydrochloric acid and then with distilled water until the washings were free of acid. Twenty g. of the washed gel was then shaken with a solution consisting of 1.8 g. palladous chloride dissolved in 26 mls. 2 N hydrochloric acid. The impregnated gel was then dried at 50° C. in a current of nitrogen and the palladous chloride then reduced to metallic palladium in a current of dry hydrogen at 150° C. After cooling the catalyst so formed was crushed to a fairly fine powder.

Example 2

6.0 g. of the catalyst prepared as in Example 1 was added to 150 mls. of a solution in 2 N perchloric acid of mercurous perchlorate containing 6% by weight of the latter. The mixture was heated to 90° C. and vigorously stirred whilst a current of oxygen was passed through the suspension. After 30 minutes 13.0% of the mercurous perchlorate was found to have been oxidised; after one hour 25.0% had been oxidised and after two hours 28.7%. Carrying on the reaction further failed to increase the conversion beyond 28.7%.

Example 3

2.0 g. of the catalyst prepared as in Example 1 was added to 50 mls. of a solution in 2 N perchloric acid of mercurous perchlorate containing 6% by weight of the latter and enclosed in a 70 mls. glass-lined autoclave equipped with a glass reciprocating stirrer. The autoclave was closed and the temperature raised to 100° C. after which oxygen was introduced up to a pressure of 50 atmospheres and stirring commenced. After one hour the autoclave was cooled and the pressure released. Analysis of the contents showed complete oxidation of mercurous to mercuric perchlorate.

Example 4

An experiment similar in temperature, pressure and time to that described in Example 3 but using 4.0 g. of the catalyst and 100 mls. of a 6% by weight solution in 2 N trifluoroacetic acid of mercurous trifluoroacetate showed complete oxidation of the latter to mercuric trifluoroacetate.

Examples 5–10

These examples, whose results are given in Table 1, all refer to experiments carried out in the general way described in Example 3 but at different pressures. All relate to a 6% by weight solution of mercurous perchlorate in 2 N perchloric acid, and to a palladium/silica catalyst containing 5% by weight of palladium.

TABLE 1

| Example | Oxygen press. in atms. | Reaction time in hours | Temp., °C. | Percent conversion mercurous to mercuric |
|---|---|---|---|---|
| 5 | 11.4 | 3 | 100 | 84.8 |
| 6 | 25.0 | 3 | 100 | 86.5 |
| 7 | 57.0 | 3 | 100 | 98.0 |
| 8 | 99.0 | 3 | 100 | 98.0 |
| 9 | 100.0 | 0.5 | 100 | 90.0 |
| 10 | 100.0 | 1.75 | 100 | 98.0 |

Examples 11–17

These examples whose results are given in Table 2 all refer to experiments carried out in the general way described in Example 3 but with different reaction times and in some cases different pressures. All relate to a 6% by weight solution of mercurous perchlorate in 2 N perchloric acid and to a palladium/silica catalyst containing 5% by weight of palladium.

TABLE 2

| Example | Oxygen press. in atms. | Reaction time in hours | Temp., °C. | Percent conversion mercurous to mercuric |
|---|---|---|---|---|
| 11 | 50.0 | 0.25 | 100 | 55.0 |
| 12 | 50.0 | 0.50 | 100 | 82.0 |
| 13 | 50.0 | 0.75 | 100 | 98.0 |
| 14 | 50.0 | 1.0 | 100 | 98.0 |
| 15 | 52.0 | 2.0 | 100 | 100.0 |
| 16 | 5.9 | 1.0 | 100 | 41.5 |
| 17 | 10.5 | 1.0 | 100 | 58.7 |

Examples 18–19

These examples whose results are given in Table 3 refer to experiments carried out in the general way described in Example 3 but with a 30% by weight solution of mercurous perchlorate in 2 N perchloric acid.

TABLE 3

| Example | Oxygen press. in atms. | Reaction time in hours | Temp., °C. | Percent conversion mercurous to mercuric |
|---|---|---|---|---|
| 18 | 87 | 3 | 100 | 60.4 |
| 19 | 140 | 3 | 100 | 86.2 |

Examples 20–24

In the five experiments comprising Examples 20–24 the same sample of catalyst was used throughout in order to gain information about catalyst life. Between each two experiments the catalyst was washed free of adhering mercury compounds and perchloric acid. The results refer to 6% by weight solutions of mercurous perchlorate in 2 N perchloric acid, and a palladium/silica catalyst containing 5% by weight of palladium; to oxygen pressure of 50 atmospheres, to reaction times of one hour and temperatures of 100° C. In all five experiments the conversions of mercurous to mercuric perchlorate were from 98% to 100%.

What we claim is:

1. A process for oxidizing mercurous salts to the corresponding mercuric salts in an acidic aqueous medium, in which the acidity is provided by the acid corresponding to the mercurous salt, by means of oxygen in the presence of a finely divided metal catalyst chosen from Group VIII of the Periodic Table and from gold, said catalyst being supported on an inert material, and the chosen metal not being soluble in nor attacked by the acidic aqueous medium, characterized in that the oxidation reaction is carried out under superatmospheric pressure wherein the oxygen partial pressure is from 10 to 150 atmospheres and the reaction temperature is from 60° C. to 150° C.

2. A process as claimed in claim 1 in which the oxygen partial pressure is from 40 to 60 atmospheres and the reaction temperature from 90° C. to 110° C.

3. A process as claimed in claim 1 in which the catalyst is selected from palladium and platinum and is in the form of the finely divided metal supported on an inert material.

4. The process of claim 1 wherein the mercurous salt is mercurous perchlorate.

5. The process of claim 1 wherein the mercurous salt is mercurous trifluoroacetate.

6. The process of claim 1 wherein the mercurous salt is mercurous p-toluenesulphonate.

7. The process of claim 1 wherein the mercurous salt is mercurous benzenesulphonate.

8. The process of claim 1 wherein the mercurous salt is mercurous sulfate.

9. The process of claim 1 wherein the catalyst is palladium.

References Cited

UNITED STATES PATENTS

| 1,721,188 | 7/1929 | Reid et al. | 23—117 |
| 1,808,253 | 6/1931 | Reid et al. | 23—117 |
| 2,277,046 | 3/1942 | Herstein | 23—117 |
| 2,289,966 | 7/1942 | Herstein | 23—117 |
| 2,914,451 | 11/1959 | Baldoni et al. | 23—87 X |

OSCAR R. VERTIZ, *Primary Examiner.*

EDWARD STERN, *Examiner.*